(12) United States Patent
Jessenig

(10) Patent No.: US 8,847,567 B2
(45) Date of Patent: Sep. 30, 2014

(54) DC/DC CONVERTER AND METHOD FOR THE CURRENT CONTROL OF A DC/DC CONVERTER

(75) Inventor: Thomas Jessenig, Graz (AT)

(73) Assignee: austriamicrosystems AG (AT)

( * ) Notice: Subject to any disclaimer, the term of this patent is extended or adjusted under 35 U.S.C. 154(b) by 0 days.

(21) Appl. No.: 13/468,561

(22) Filed: May 10, 2012

(65) Prior Publication Data

US 2012/0293148 A1 Nov. 22, 2012

(30) Foreign Application Priority Data

May 18, 2011 (DE) .......................... 10 2011 101 916

(51) Int. Cl.
*H02M 1/00* (2006.01)
*H02M 3/156* (2006.01)

(52) U.S. Cl.
CPC ...... *H02M 3/156* (2013.01); *H02M 2001/0009* (2013.01)
USPC .......................................... 323/283; 323/286

(58) Field of Classification Search
CPC .............................. H02M 3/156; H02M 3/157
USPC .......... 282/222, 271, 282, 283, 284, 285, 286
See application file for complete search history.

(56) References Cited

U.S. PATENT DOCUMENTS

| | | | |
|---|---|---|---|
| 2005/0035746 A1* | 2/2005 | Bernacchia et al. | 323/282 |
| 2005/0035748 A1* | 2/2005 | Inn | 323/285 |
| 2005/0237041 A1 | 10/2005 | Weng | |
| 2007/0019450 A1 | 1/2007 | Tiew et al. | |
| 2010/0085029 A1* | 4/2010 | Xie | 323/299 |
| 2010/0244800 A1* | 9/2010 | Nakamura et al. | 323/284 |

* cited by examiner

*Primary Examiner* — Nguyen Tran
(74) *Attorney, Agent, or Firm* — DLA Piper LLP (US)

(57) ABSTRACT

A DC/DC converter includes an input to which an input current is supplied, an output at which an output current is provided, and a current control circuit coupled to the input and the output includes a unit that provides an instantaneous value signal proportional to the output current of the DC/DC converter with the aid of the input current, an internal input that supplies a reference signal, and a comparison device coupled to the unit that provides the instantaneous value signal and the internal input and comprises an internal output that provides a control signal dependent on a comparison of the instantaneous value signal with the reference signal, wherein the control signal adjusts the output current of the DC/DC converter.

11 Claims, 4 Drawing Sheets

DC/DC CONVERTER AND METHOD FOR THE CURRENT CONTROL OF A DC/DC CONVERTER

RELATED APPLICATION

This application claims priority of German Patent Application No. 10 2011 101 916.6 filed May 18, 2011, herein incorporated by reference.

TECHNICAL FIELD

This disclosure pertains to DC/DC converters and methods for the current control thereof.

BACKGROUND

DC/DC converters are also referred to as direct current converters or direct DC converters and convert a direct voltage supplied to the input into a direct voltage with a higher, lower or inverted voltage level. The conversion is realized with the aid of periodically operating electronic switches and with one or more energy storage devices.

A current control circuit may comprise a sensing resistor connected to the output of the converter. The second terminal of this sensing resistor is once again connected to the converter via an additional pin thereof. The output current of the DC/DC converter is measured with the aid of the sensing resistor. This means that an additional pin is required on the one hand and a sensing resistor is required on the other hand to measure and adjust the level of the output current by a control. The sensing resistor also leads to reduced efficiency due to the voltage drop occurring at the sensing resistor. In contrast to related charge controllers, it is not possible to readily measure the input current of DC/DC converters to indirectly determine the intensity of the output current based thereon, namely because the output current of a DC/DC converter is higher than the input current.

It could therefore be helpful to provide a DC/DC converter with improved current control.

SUMMARY

I provide a DC/DC converter including an input to which an input current is supplied, an output at which an output current is provided, and a current control circuit coupled to the input and the output including a unit that provides an instantaneous value signal proportional to the output current of the DC/DC converter with the aid of the input current, an internal input that supplies a reference signal, and a comparison device coupled to the unit that provides the instantaneous value signal and the internal input and comprises an internal output that provides a control signal dependent on a comparison of the instantaneous value signal with the reference signal, wherein the control signal adjusts the output current of the DC/DC converter.

I also provide a method for current control of a DC/DC converter, including supplying an input current to a DC/DC converter, feeding a reference signal to a current control circuit of a DC/DC converter, measuring an instantaneous value signal proportional to an output current of the DC/DC converter with the aid of the input current, determining a control signal dependent on a comparison of the instantaneous value signal with the reference signal, and adjusting the output current of the DC/DC converter dependent on the control signal.

DETAILED DESCRIPTION

Figure 1:
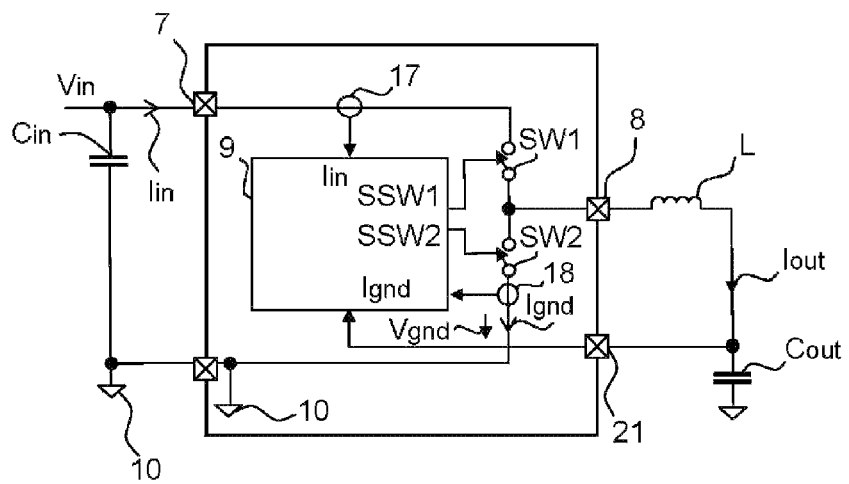
FIG. 1 shows an example of a DC/DC converter.

It will be appreciated that the following description is intended to refer to specific examples of structure selected for illustration in the drawings and is not intended to define or limit the disclosure, other than in the appended claims.

I provide a DC/DC converter that may comprise an input, to which an input current is supplied, an output, at which an output current is provided, and a current control circuit coupled to the input and the output. The current control circuit may comprise a unit that provides an instantaneous value signal proportional to the output current of the DC/DC converter with the aid of the input current, an internal input that supplies a reference signal and a comparison device coupled to the unit to provide the instantaneous value signal and to the internal input. The comparison device may comprise an internal output that provides a control signal depending on a comparison of the instantaneous value signal with the reference signal. In this case, the control signal is designed to adjust the output current of the DC/DC converter.

The DC/DC converter converts the supplied input current into the output current. The unit determines the instantaneous value signal proportional to the output current of the DC/DC converter with the aid of the input current. The control signal is determined in the comparison device by comparing the instantaneous value signal with the reference signal. The output current of the DC/DC converter is adjusted with the aid of the control signal.

Instead of measuring the output current of the DC/DC converter directly in the output circuit of the converter, the instantaneous value signal is determined at the converter input and the control signal that adjusts the intensity of the output current is generated with the aid of the reference signal. This advantageously enables current control of the DC/DC converter without a sensing resistor at the output and, therefore, also without a separate pin that would only be required for this measurement. This structure is significantly simplified in comparison to the above described art. Since the voltage drop occurring at the otherwise required sensing resistor is also eliminated, the efficiency of the DC/DC converter is increased with my current control.

The reference signal is proportional to an adjustable target value of the output current of the DC/DC converter.

Additionally, the current control circuit of the DC/DC converter may feature a low-pass filter inserted between the unit to provide the instantaneous value signal and the comparison device. The low-pass filter is designed to form the average value of the instantaneous value signal.

The unit that provides the instantaneous value signal may feature a measuring device to measure the input current of the DC/DC converter or to measure an input voltage proportional to the input current of the DC/DC converter.

This measuring device is, for example, in the form of a current mirror that represents an image of the electronic switch situated in the input current path of the DC/DC converter, i.e., of the switching transistor. The input current is directly measured in this case. Alternatively, the measuring device includes a sensing resistor in the current path, wherein the voltage drop occurring at this sensing resistor serves as measure and for the input current—if applicable in amplified form.

The reference signal may be clocked with a duty cycle of the DC/DC converter and averaged by another low-pass filter.

The reference signal, therefore, is pulsed in the duty cycle of the DC/DC converter and subsequently fed to the comparison device in low-pass filtered form. It is compared with the instantaneous value signal that in this case is the averaged input current. The comparison device determines the control signal therefrom.

In this case, the instantaneous value signal proportional to the output current is simply calculated by measuring the input current and taking into account the duty cycle of the DC/DC converter. It is advantageous that a measurement of the output current of the DC/DC converter is not required in this case.

Alternatively, the unit that provides the instantaneous value signal may feature another measuring device to measure a ground current of the DC/DC converter or a ground voltage proportional to the ground current of the DC/DC converter and an adding unit. The input current or the input voltage and the ground current or the ground voltage are fed to the adding unit. The adding unit is designed to provide the instantaneous value signal in the form of the sum of the input current and the ground current or the sum of the input voltage and the ground voltage.

In this case, the instantaneous value signal is determined by measuring the input current and the ground current or the respective voltages proportional thereto and the subsequent summation thereof. The sum of the ground current and the input current results in the output current. In this case, it is also not required to measure the output current of the DC/DC converter and to accordingly provide at least one resistor and an additional pin for this purpose.

The ground current is a current flowing between the output of the DC/DC converter and a reference potential terminal.

Additionally, the DC/DC converter features a first and a second electronic switch and a generator. The control signal is fed to the generator. The generator is designed to provide at least one activation signal for the electronic switches of the DC/DC converter in dependence on a pulse-width modulation as a function of the control signal.

The first electronic switch is inserted between the input and the output of the DC/DC converter. The second electronic switch is inserted between the output and the reference potential terminal of the DC/DC converter. The switches are respectively activated with a pulse-width modulated signal of the generator. The activation of the two switches takes place in a non-overlapping fashion. Consequently, the input current flows via the first electronic switch and the ground current of the DC/DC converter flows via the second electronic switch.

The generator is implemented, for example, in the form of a comparator that compares the control signal with a sawtooth signal and generates the pulse-width modulated activation signals for the electronic switches thereof. This applies to a DC/DC converter in the voltage mode. In a DC/DC converter in the current mode, the input current of the DC/DC converter can be additionally taken into account in the comparator.

The electronic switches may be respectively in the form of a bipolar transistor, i.e., a MOSFET or Metal Oxide Semiconductor Field Effect Transistor, or in the form of a Junction-FET. The second electronic switch may also be in the form of a diode. In this case, the generator merely generates an activation signal for the first electronic switch.

Additionally, the DC/DC converter is realized in the form of a charge controller. A charge controller is also referred to as a charger.

My methods for the current control of a DC/DC converter may feature:

supplying an input current to a DC/DC converter, feeding a reference signal to a current control circuit of the DC/DC converter, measuring an instantaneous value signal proportional to an output current of the DC/DC converter with the aid of the input current, determining a control signal in dependence on a comparison of the instantaneous value signal with the reference signal, and adjusting the output current of the DC/DC converter in dependence on the control signal.

The previously required elaborate measurement of the output current is eliminated due to the fact that the method is based on measuring the instantaneous value signal proportional to the output current of the DC/DC converter.

Additionally, the measurement of the instantaneous value signal may include measuring the input current of the DC/DC converter or an input voltage proportional to the input current of the DC/DC converter. In this case, the reference signal is pulsed in dependence on a duty cycle of the DC/DC converter.

In this case, the control signal is determined by comparing the input current or the input voltage with the pulsed reference signal. Both signals used for the comparison may be previously averaged for this purpose. The comparison itself takes place in the current or voltage domain.

Alternatively, measurement of the instantaneous value signal is realized by:

measuring the input current of the DC/DC converter or the input voltage proportional to the input current of the DC/DC converter, measuring the ground current of the DC/DC converter or a ground voltage proportional to the ground current of the DC/DC converter, and adding the input current and the ground current or adding the input voltage and the ground voltage.

In this case, the input current and the ground current or the corresponding voltages are added and form the instantaneous value signal. This signal is compared with the reference signal directly or in averaged form. This comparison also takes place in the current domain or in the voltage domain.

The methods may also include the step of generating at least one activation signal for electronic switches of the DC/DC converter in dependence on a pulse-width modulation with the control signal.

The control signal is used to generate a pulse-width modulated signal that activates the first and the second electronic switch of the DC/DC converter in a non-overlapping fashion.

My converters and methods are described in greater detail below with reference to the figures. Components and circuit elements that function or operate identically are identified by the same reference symbols. In this respect, the description of components that fulfill corresponding functions is not repeated for each of the figures.

FIG. 1 shows an example of a DC/DC converter. The DC/DC converter comprises an input 7, to which an input current Iin is supplied, an output 8, at which an output current out is provided, and a current control circuit 9. The current control circuit 9 is coupled to the input 7 and the output 8. The DC/DC converter furthermore comprises a first measuring device 17 that measures the input current Iin of the DC/DC converter or measures an input voltage Vin of the DC/DC converter proportional to the input current Iin. The measuring device 17 connects to the input 7 and to a first electronic switch SW1. An additional measuring device 18 is provided to measure a ground current Ignd or measure a ground voltage Vgnd of the DC/DC converter proportional to the ground current Ignd. The additional measuring device 18 connects to a reference potential terminal 10 and to a second electronic switch SW2.

The DC/DC converter also features the first electronic switch SW1 and the second electronic switch SW2. The first electronic switch SW1 is inserted between the input 7 and the output 8. It is controlled with a corresponding first activation signal SSW1 made available by the current control circuit 9. The second electronic switch SW2 is inserted between the output 8 and the reference potential terminal 10 of the DC/DC converter and controlled with a second activation signal SSW2 made available by the current control circuit 9. The second measuring device 18 is optional and used for the second example of the current control circuit 9 illustrated in FIG. 4.

The external wiring of the DC/DC converter is also shown. It comprises an input capacitance Cin coupled to the input 7 and refers to the reference potential terminal 10. The energy storage device used by the DC/DC converter is an inductance L connected to the output 8 of the DC/DC converter. A smoothing capacitance Cout is coupled to another output 21 of the DC/DC converter and refers to the reference potential terminal 10. The output smoothing capacitance Cout is not required if the battery capacity is sufficiently high and a corresponding noise filter is provided.

This figure also shows a voltage feedback from an additional output 21 to the current control circuit 9 used for voltage control of the DC/DC converter. However, the current control of the DC/DC converter is described in an exemplary fashion.

According to the conventional working principle of a DC/DC converter, the supplied input current Iin is made available at the output 8 in a continuous mode when the first electronic switch SW1 is closed and fed to the inductance L. In the subsequent discontinuous phase, in which the first switch SW1 is opened and the second switch SW2 is closed, the ground current Ignd flows via the second switch SW2. The continuous and the discontinuous phase do not overlap in this case. Consequently, mutually inverted activation signals SSW1 and SSW2 are normally used to activate the first and the second switch SW1, SW2. The desired ratio between input and output voltage Vin, Vout is achieved due to the described activation of the switches SW1 and SW2 and the thusly caused current flow through the inductance L. The following, therefore, applies to the exemplary step-down converter shown that is operated with fixed frequency in a continuous mode:

$T = T\text{on} + T\text{off};$ $T\text{on} = T(SSW1);$ $T\text{off} = T(SSW2);$ $TV = T\text{on}/(T\text{on} + T\text{off}) = V\text{out}/V\text{in};$ In this case, T designates the overall period of one cycle of the DC/DC converter, Ton designates the on-time, during which the switch SW1 is closed under the control of the activation signal SSW1, Toff designates the off-time, during which the switch SW2 is closed under the control of the activation signal SSW2, Vout corresponds to the output voltage Vout and Vin corresponds to the input voltage Vin of the DC/DC converter. TV represents the duty cycle of the DC/DC converter.

Consequently, the adjusted duty cycle TV is a measure for the ratio of the output voltage Vout to the input voltage Vin.

Figure 2:
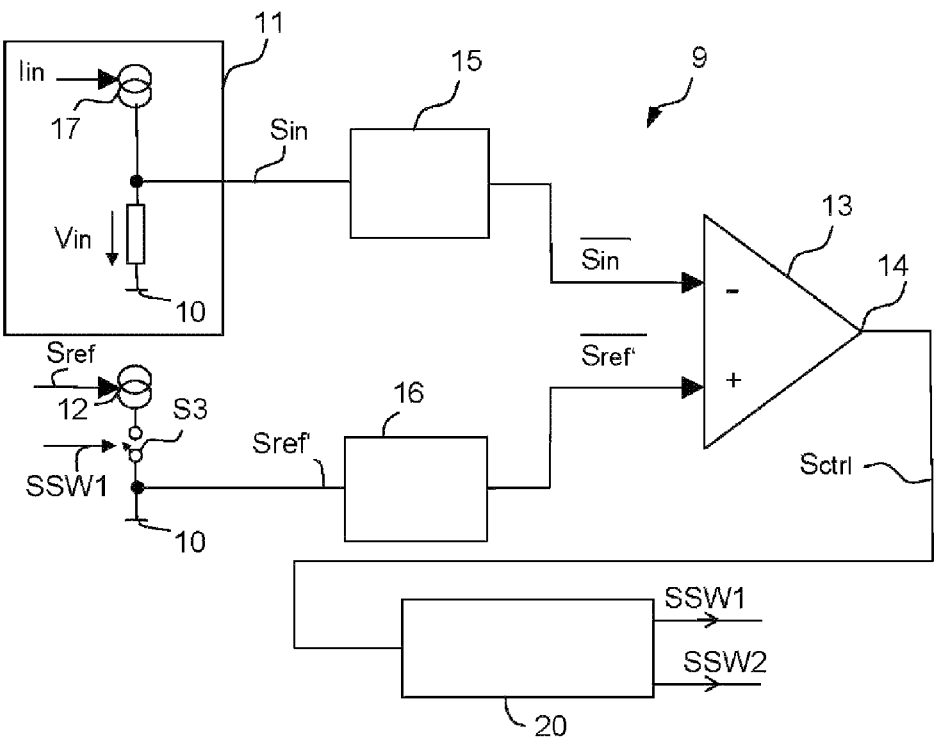
FIG. 2 shows a first example of a current control circuit.

FIG. 2 shows a first example of a current control circuit for a DC/DC converter. The current control circuit 9 comprises a unit 11, a low-pass filter 15, another low-pass filter 16, a comparison device 13, an internal output 14, an internal input 12, a generator 20 and a switch S3 coupled to the internal input 12 and the low-pass filter 16.

The unit 11 that provides an instantaneous value signal Sin comprises the measuring device 17, by which the input current Iin is measured in this example. The instantaneous value signal Sin is made available in the form of the input voltage Vin in this case. The measuring device 17 is, for example, in the form of a current source or a current mirror controlled by the input current Iin. An image of the switching transistor of the first electronic switch SW1 is used in the current mirror. The instantaneous value signal Sin is averaged in the low-pass filter 15 and fed to the comparison device 13. The comparison device 13 comprises, for example, a comparator.

A reference signal Sref is fed to the internal input 12 of the current control circuit 9. The reference signal Sref is proportional to an adjustable target value Iout_limit of the output current Iout of the DC/DC converter. The reference signal Sref is pulsed with the aid of the switch S3 that is controlled with the first activation signal SSW1. The thus obtained pulsed reference signal Sref', in this case in the form of a voltage Vref, is fed to the additional low-pass filter 16. The additional low-pass filter 16 provides the averaged pulsed reference signal Sref' that is also fed to the comparison device 13. The comparison device 13 determines the control signal Sctrl from a comparison of the two signals at its inputs. The control signal Sctrl is fed to the generator 20 connected to the internal input 14 and generates the pulse-width modulated activation signals SSW1 and SSW2 to control the electronic switches SW1, SW2 of the DC/DC converter thereof.

Consequently, the control signal Sctrl is obtained from a comparison of the measured input current Iin with the pulsed reference signal Sref'. The control signal Sctrl is then used to generate the activation signals SSW1, SSW2 for the electronic switches SW1, SW2 that ultimately adjust the level of the output current Iout of the DC/DC converter.

Consequently, it is merely required to measure the input current Iin to adjust the output current Iout. It is advantageous that an elaborate measurement of the output current Iout is not required. An additional pin, as well as a sensing resistor, therefore, are also not required such that the efficiency is increased because the voltage drop across the sensing resistor is eliminated.

The low-pass filters 15 and 16 may belong to any order and may have any topology. They may be realized in the current domain or in the voltage domain. The comparator may be in the form of an operational amplifier or in the form of a transconductance amplifier depending on whether currents or voltages are supplied.

Figure 3:
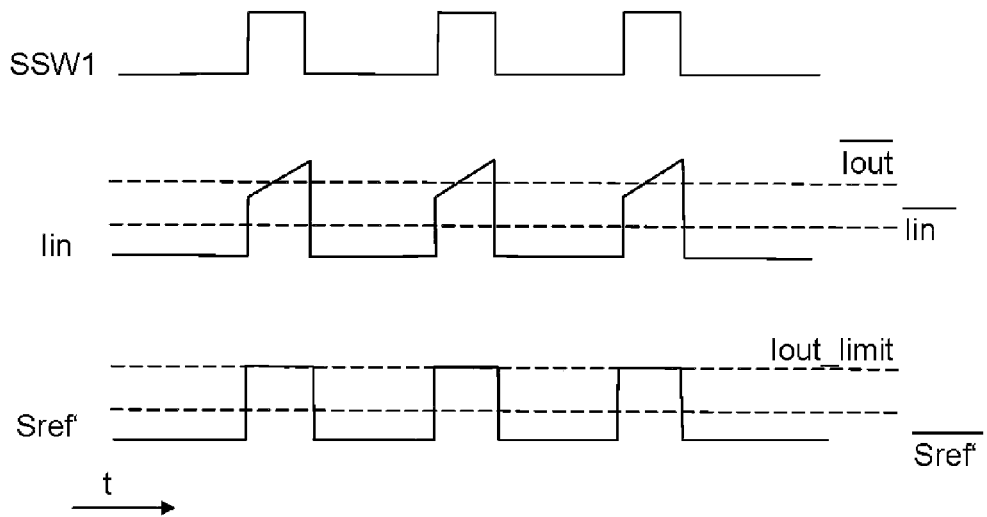
FIG. 3 shows an example of signal shapes for the current control circuit according to FIG. 2.

FIG. 3 shows exemplary signal shapes for the example according to FIG. 2. A time course of a signal is illustrated in each line of FIG. 3. The first line shows the course of the first activation signal SSW1. The second line shows the course of the input current Iin. The third line shows the course of the pulsed reference signal Sref' applied to the input of the low-pass filter 16 according to FIG. 2.

The first electronic switch SW1 is closed while the activation signal SSW1 is high. Consequently, the first measuring device 17 is provided to measure the course of the input current Iin shown. The lower, broken horizontal line shows the averaged value of the input current Iin that is fed, for example, to the input of the comparison device 13 according to FIG. 2. The pulsed reference signal Sref' assumes the adjustable target value Iout_limit of the output current Iout while the switch SW1 is switched on. Consequently, this results in the average value of the pulsed reference signal Sref' that is illustrated with a broken line.

Figure 4:
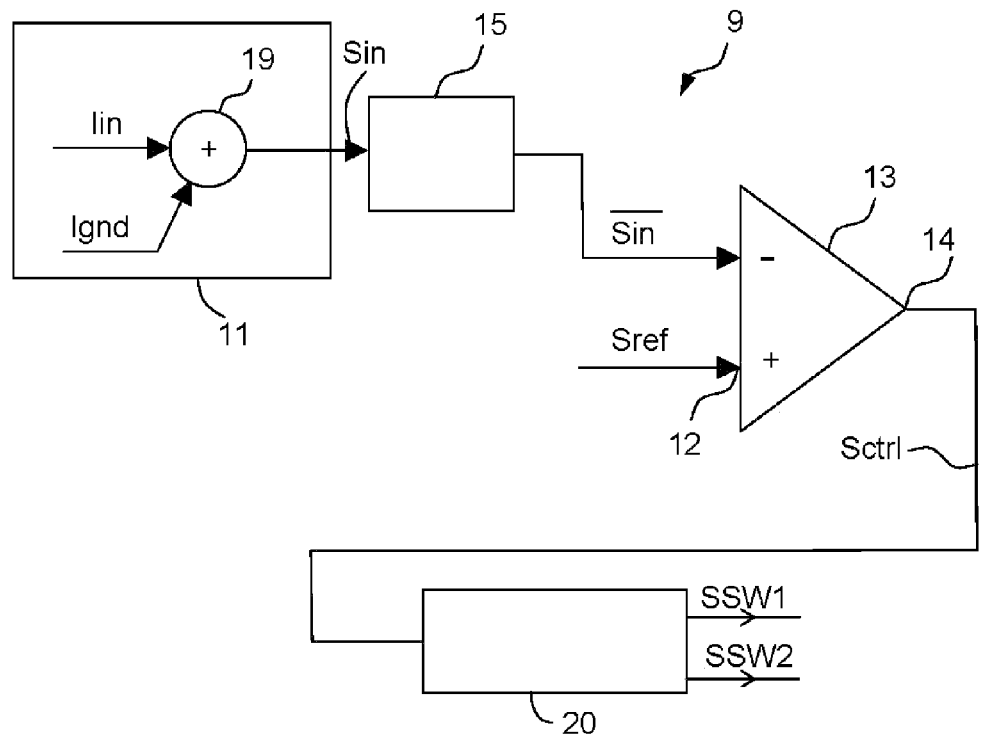
FIG. 4 shows a second example of a current control circuit.

FIG. 4 shows another example of a current control circuit for the DC/DC converter. In this case, the unit 11 that provides the instantaneous value signal Sin is designed differently from that in FIG. 2. The unit 11 comprises an adding unit 19. The input current Iin measured by the measuring device 17 according to FIG. 1 on the one hand and the ground current Ignd measured by the measuring device 18 on the other hand are fed to this adding unit 19. The additional measuring device 18 is respectively, for example, in the form of a current source or a current mirror controlled by the ground current Ignd analogous to the measuring device 17 in the preceding description. The instantaneous value signal Sin is provided by adding these two currents Iin and Ignd and fed to the comparison device 13 via the low-pass filter 15. The reference signal Sref' at the internal input 12 is fed to the other input of the comparison device 13. The comparison device 13 determines the control signal Sctrl by comparing the averaged instantaneous value signal Sin with the reference signal Sref, wherein the control signal Sctrl is fed to the generator 20 for the activation signals SSW1 and SSW2.

In this alternative structure, an instantaneous value signal Sin proportional to the output current Iout is determined from the input current Iin and the ground current Ignd. A direct measurement of the output current Iout is also not required in this case. The above-described advantages are attained.

To further increase the stability of the control signal Sctrl, a compensation circuit in the form of an RC network may be additionally connected in series to the input of the generator 20.

Another circuit that generates so-called "minimum timings" for the switches SW1 and SW2 may also be provided in the generator.

Figure 5:
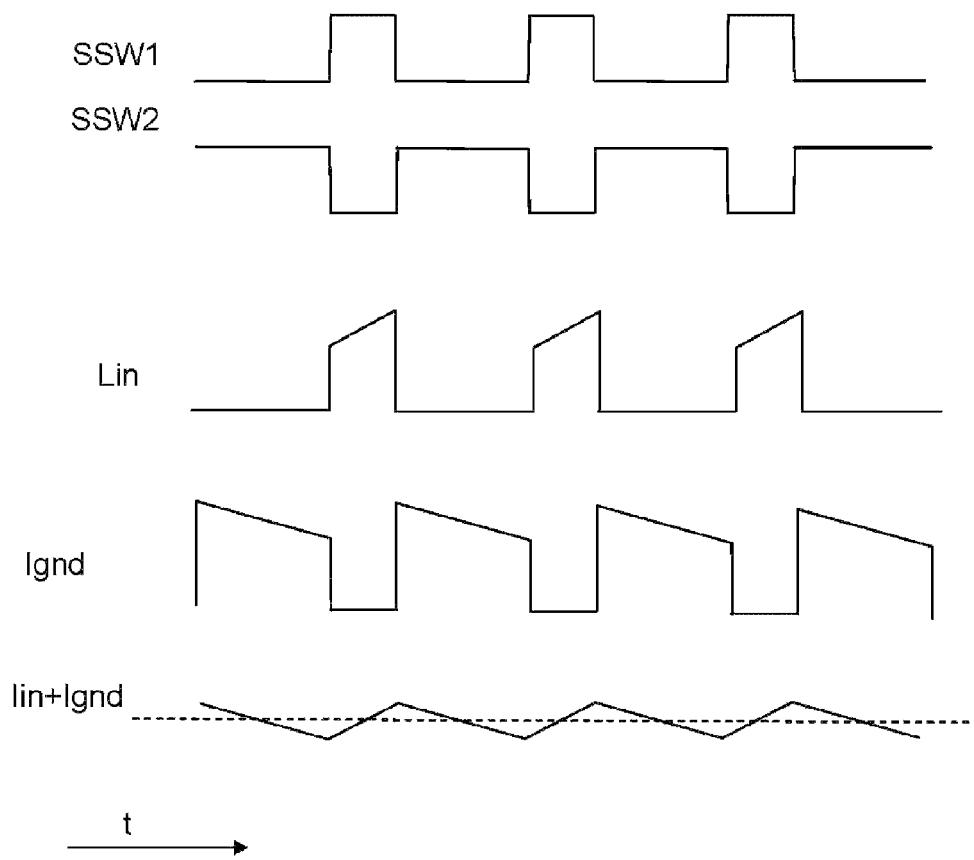
FIG. 5 shows an example of signal shapes for the current control circuit according to FIG. 4.

FIG. 5 shows exemplary signal shapes for the current control circuit according to FIG. 4. In this case, a time course of a signal is once again illustrated in each line. The first line shows the course of the first activation signal SSW1. The second line shows the course of the second activation signal SSW2. The third line shows the course of the input current Iin measured by the measuring device 17. The fourth line shows the course of the ground current Ignd measured by the measuring device 18. The fifth line shows the course of the sum of Iin and Ignd, i.e., the shape of the instantaneous value signal Sin.

According to the first line and the second line, the activation signals SSW1 and SSW2 are mutually inverted such that either the switch SW1 or the switch SW2 is closed and the other respective switch is opened in the DC/DC converter according to FIG. 1. Consequently, the currents Iin and Ignd are also offset relative to one another in time. The instantaneous value signal Sin is obtained by adding the two currents Iin and Ignd.

Figure 6:
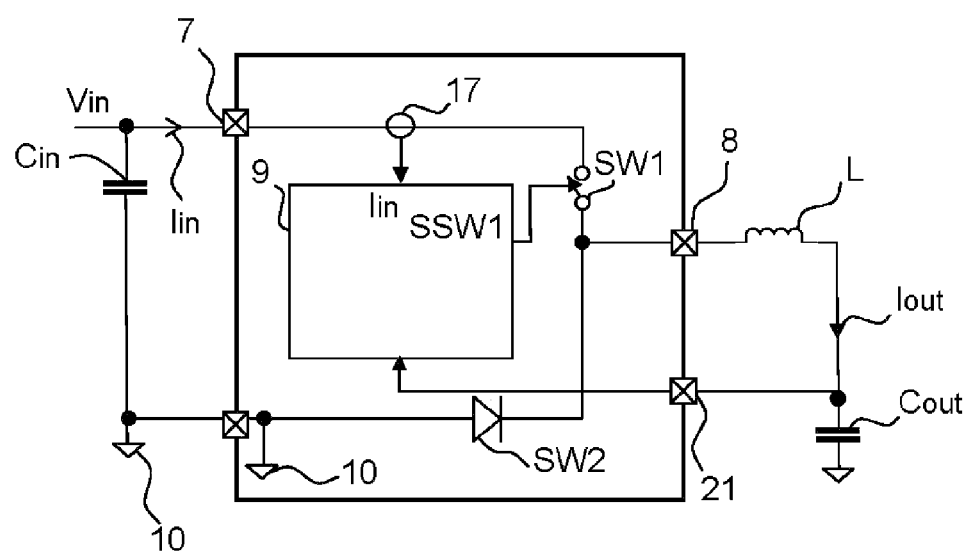
FIG. 6 shows another example of a DC/DC converter.

FIG. 6 shows another example of a DC/DC converter. The example shown essentially corresponds to that illustrated in FIG. 1, but differs in that the second electronic switch SW2 is in the form of a diode. In this case, the cathode terminal connects to the output 8. The anode terminal is coupled to the reference potential terminal 10. The current control circuit 9, therefore, generates only the first activation signal SSW1. The measuring device 18 is not needed in this example because the DC/DC converter shown is operated with a current control circuit of the type illustrated in FIG. 2. Those skilled in the art can gather the function of this DC/DC converter from the preceding descriptions of FIGS. 1 and 2.

Although the apparatus and methods have been described in connection with specific forms thereof, it will be appreciated that a wide variety of equivalents may be substituted for the specified elements described herein without departing from the spirit and scope of this disclosure as described in the appended claims.

The invention is:

1. A DC/DC converter comprising:
an input to which an input current (Iin) is supplied,
an output at which an output current (Iout) is provided, and
a current control circuit coupled to the input and the output, comprising:
an internal input that supplies a reference signal (Sref) which is clocked with a duty cycle of the DC/DC converter and provided as a pulsed reference signal (Sref'), and
a unit that provides an instantaneous value signal (Sin) using the input current (Iin), the instantaneous value signal (Sin) being proportional to the output current (Iout) of the DC/DC converter,
wherein the unit that provides an instantaneous value signal (Sin) comprises a measuring device that measures the input current (Iin) of the DC/DC converter or an input voltage (Vin) proportional to the input current (Iin) of the DC/DC converter,
wherein the current control circuit further comprises a first and a second low-pass filter and a comparison device, the first low pass filter is coupled between the unit that provides the instantaneous value signal (Sin) and a first input of the comparison device and provides an average value of the instantaneous value signal (Sin) as an averaged instantaneous value signal ($\overline{Sin}$),
the second low pass filter is coupled between the internal input and a second input of the comparison device and provides the average of the pulsed reference signal (Sref') as an averaged pulsed reference signal ($\overline{Sref'}$), and
the comparison device comprises an internal output that provides a control signal (Sctrl) dependent on a comparison of the averaged instantaneous value signal ($\overline{Sin}$) to the averaged pulsed reference signal ($\overline{Sref'}$),
wherein the control signal (Sctrl) adjusts the output current (Iout) of the DC/DC converter.

2. The DC/DC converter according to claim 1, further comprising:
a first and a second electronic switch (SW1, SW2), and
a generator supplied with the control signal (Sctrl) and provides at least one activation signal (SSW1, SSW2) for the electronic switches (SW1, SW2) of the DC/DC converter dependent on a pulse-width modulation as a function of the control signal (Sctrl).

3. The DC/DC converter according to claim 1, wherein the DC/DC converter is a charge controller.

4. A method for the current control of a DC/DC converter, comprising:
supplying an input current to a DC/DC converter,
feeding a reference signal (Sref) to a current control circuit of a DC/DC converter,
clocking the reference signal (Sref) with a duty cycle of the DC/DC converter and providing a pulsed reference signal (Sref'),
measuring an instantaneous value signal (Sin) proportional to an output current (Iout) of the DC/DC converter with the aid of the input current (Iin) by measuring the input current of the DC/DC converter or an input voltage (Vin) proportional to the input current (Iin) of the DC/DC converter, providing an averaged instantaneous value signal ($\overline{Sin}$) by low-pass filtering the instantaneous value signal (Sin), providing an averaged pulsed reference signal ($\overline{Sref'}$) by low-pass filtering the pulsed reference signal (Sref'), determining a control signal (Sctrl) depending on a comparison of the averaged instantaneous value signal ($\overline{Sin}$) to the averaged pulsed reference signal ($\overline{Sref'}$), and adjusting the output current (Iout) of the DC/DC converter dependent on the control signal (Sctrl).

5. The method according to claim 4, further comprising generating at least one activation signal (SSW1, SSW2) for electronic switches (SW1, SW2) of the DC/DC converter depending on a pulse-width modulation with the control signal (Sctrl).

6. A DC/DC converter comprising:
an input to which an input current (Iin) is supplied,
an output at which an output current (Iout) is provided, and
a current control circuit coupled to the input and the output, comprising:
an internal input that supplies a reference signal (Sref) which is clocked with a duty cycle of the DC/DC converter and is provided as pulsed reference signal (Sref'), and
a unit that provides an instantaneous value signal (Sin) using the input current (Iin), the instantaneous value signal (Sin) being proportional to the output current (Iout) of the DC/DC converter,
wherein the unit that provides the instantaneous value signal (Sin) comprises a measuring device that measures the input current (Iin) of the DC/DC converter or an input voltage (Vin) proportional to the input current (Iin) of the DC/DC converter, another measuring device for measuring a ground current (Ignd) of the DC/DC converter or a ground voltage (Vgnd) proportional to the ground current (Ignd) of the DC/DC converter, as well as an adding unit, wherein the input current (Iin) or the input voltage (Vin) and the ground current (Ignd) or the ground voltage (Vgnd) are fed to the adding unit and the adding unit provides the instantaneous value signal (Sin) in the form of a sum of the input current (Iin) and the ground current (Ignd) or of the input voltage (Vin) and the ground voltage (Vgnd),
wherein the current control circuit further comprises a first and a second low-pass filter and a comparison device, the first low pass filter is coupled between the unit that provides the instantaneous value signal (Sin) and a first input of the comparison device and provides the average value of the instantaneous value signal (Sin) as averaged instantaneous value signal ($\overline{Sin}$),
the second low pass filter is coupled between the internal input and a second input of the comparison device and provides the average of the pulsed reference signal (Sref') as averaged pulsed reference signal ($\overline{Sref'}$), and
the comparison device comprises an internal output that provides a control signal (Sctrl) dependent on a comparison of the averaged instantaneous value signal ($\overline{Sin}$) to the averaged pulsed reference signal ($\overline{Sref'}$),
wherein the control signal (Sctrl) adjusts the output current (Iout) of the DC/DC converter.

7. A method for the current control of a DC/DC converter, comprising:
supplying an input current to a DC/DC converter,
feeding a reference signal (Sref) to a current control circuit of a DC/DC converter,
clocking the reference signal (Sref) with a duty cycle of the DC/DC converter and providing a pulsed reference signal (Sref'),
measuring an instantaneous value signal (Sin) proportional to an output current (Iout) of the DC/DC converter with the aid of the input current (Iin) by:
measuring the input current of the DC/DC converter or an input voltage (Vin) proportional to the input current (Iin) of the DC/DC converter, measuring a ground current (Ignd) of the DC/DC converter or a ground voltage (Vgnd) proportional to the ground current (Ignd) of the DC/DC converter, and adding the input current (Iin) and the ground current (Ignd) or adding the input voltage (Vin) and the ground voltage (Vgnd),
providing an averaged instantaneous value signal ($\overline{Sin}$) by low-pass filtering the instantaneous value signal (Sin),
providing an averaged pulsed reference signal ($\overline{Sref'}$) by low-pass filtering the pulsed reference signal (Sref'),
determining a control signal (Sctrl) dependent on a comparison of the averaged instantaneous value signal ($\overline{Sin}$) with the averaged pulsed reference signal ($\overline{Sref'}$), and
adjusting the output current (Iout) of the DC/DC converter dependent on the control signal (Sctrl).

8. The DC/DC converter according to claim 1, wherein the instantaneous value signal (Sin) is calculated by measuring the input current (Iin) and taking into account the duty cycle of the DC/DC converter.

9. The method according to claim 4, wherein the instantaneous value signal (Sin) is calculated by measuring the input current (Iin) and taking into account the duty cycle of the DC/DC converter.

10. The DC/DC converter according to claim 6, wherein the instantaneous value signal (Sin) is calculated by measuring the input current (Iin) and taking into account the duty cycle of the DC/DC converter.

11. The method according to claim 7, wherein the instantaneous value signal (Sin) is calculated by measuring the input current (Iin) and taking into account the duty cycle of the DC/DC converter.

* * * * *